(12) United States Patent
Aboul-Magd et al.

(10) Patent No.: US 9,148,213 B2
(45) Date of Patent: Sep. 29, 2015

(54) SYSTEM AND METHOD FOR RADIO FREQUENCY REPEATING

(71) Applicant: FutureWei Technologies, Inc., Plano, TX (US)

(72) Inventors: Osama Aboul-Magd, Kanata (CA); Kwok Shum Au, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 120 days.

(21) Appl. No.: 13/872,622

(22) Filed: Apr. 29, 2013

(65) Prior Publication Data

US 2013/0294328 A1    Nov. 7, 2013

Related U.S. Application Data

(60) Provisional application No. 61/642,912, filed on May 4, 2012.

(51) Int. Cl.
*H04B 7/15* (2006.01)
*H04B 7/155* (2006.01)

(52) U.S. Cl.
CPC .............. *H04B 7/15* (2013.01); *H04B 7/15528* (2013.01)

(58) Field of Classification Search
None
See application file for complete search history.

(56) References Cited

U.S. PATENT DOCUMENTS

| 7,756,162 B2 * | 7/2010 | Adachi et al. ................. 370/501 |
| 2005/0275529 A1 | 12/2005 | Kates |
| 2006/0220828 A1 | 10/2006 | Charlot, Jr. et al. |

FOREIGN PATENT DOCUMENTS

| CN | 1981313 A | 6/2007 |
| CN | 101501739 A | 8/2009 |
| EP | 2547008 A2 | 1/2013 |
| WO | 2011112056 A2 | 9/2011 |

OTHER PUBLICATIONS

"IEEE Draft P802.11-REVmb™/D12," IEEE Standard for Information Technology—Telecommunications and information exchange between systems—Local and metropolitan area networks—Specific requirements, Part 11: Wireless LAN Medium Access Control (MAC) and Physical Layer (PHY) Specifications, IEEE Nov. 2011, 2910 pages.
PCT International Search Report and Written Opinion for PCT/CN2013/075180, Applicant: Huawei Technologies Co., Ltd., mailed Aug. 15, 2013, 13 pages.
Extended European Search Report, Application No. 13784146.6, mailed Apr. 20, 2015, 8 pages.

* cited by examiner

*Primary Examiner* — Frank Duong
(74) *Attorney, Agent, or Firm* — Slater & Matsil, L.L.P.

(57) ABSTRACT

In one embodiment, a method for relaying frames including receiving, by a repeater from a first station, a first frame, where the first frame has a first header having a first indicator and determining whether the first frame will be relayed in accordance with the first indicator. The method also includes transmitting, by the repeater to an access point, the first frame when the first frame is determined to be relayed.

21 Claims, 9 Drawing Sheets

SYSTEM AND METHOD FOR RADIO FREQUENCY REPEATING

This application claims the benefit of U.S. Provisional Application Ser. No. 61/642,912 filed on May 4, 2012, and entitled "System and Method for Using an RF Repeater in a Wireless Network," which application is hereby incorporated herein by reference.

TECHNICAL FIELD

The present invention relates to a system and method for wireless communications, and, in particular, to a system and method for radio frequency repeating.

BACKGROUND

Networks such as wireless local area network (WLAN) based on Institute of Electrical and Electronics Engineers (IEEE) 802.11 technology are popular networks. The IEEE 802.11 family includes a series of half-duplex over-the-air modulation techniques that use the same basic protocol. Frames in IEEE 802.11 include a physical layer (PHY) header and a media access control (MAC) header.

The PHY layer is the lowest layer. In a WLAN, the PHY layer interacts with the MAC layer. Also, the PHY layer performs data encoding, transmission, reception, and decoding.

The MAC layer acts as an interface between the PHY layer and the logical link control (LLC) layer. The MAC layer emulates a full-duplex logical communications channel in a multi-point network.

The LLC layer provides multiplexing mechanisms that enable network protocols to coexist within a multipoint network and to be transported over the same network medium. The LLC layer interfaces with the MAC layer and the network layer.

SUMMARY

An embodiment method for relaying frames including receiving, by a repeater from a first station, a first frame, where the first frame has a first header having a first indicator and determining whether the first frame will be relayed in accordance with the first indicator. The method also includes transmitting, by the repeater to an access point, the first frame when the first frame is determined to be relayed.

An embodiment method for communicating in a wireless network includes determining whether a station is a power constrained device and setting an indicator in a header of a frame in accordance with whether the station is a power constrained device. The method also includes transmitting, by the station to an access point, the frame.

An embodiment method of designating a repeater includes receiving, by an access point, a first plurality of messages from a second plurality of stations, where the first plurality of messages indicates whether the second plurality of stations supports repeater functionality and determining a subset of the second plurality of stations in accordance with the first plurality of messages, where stations of the subset of the second plurality of stations support repeater functionality. The method also includes selecting a first station of the subset of the second plurality of stations to be designated as a repeater and transmitting, by the access point to the first station, a first designate repeater request frame indicating that the first station is the repeater.

An embodiment repeater includes a processor and a computer readable storage medium storing programming for execution by the processor. The programming includes instructions to receive, from a station, a frame, where the frame has a header having an indicator and determine whether the frame will be relayed in accordance with the indicator. The programming also includes instructions to transmit, to an access point, the frame when the frame is determined to be relayed.

The foregoing has outlined rather broadly the features of an embodiment of the present invention in order that the detailed description of the invention that follows may be better understood. Additional features and advantages of embodiments of the invention will be described hereinafter, which form the subject of the claims of the invention. It should be appreciated by those skilled in the art that the conception and specific embodiments disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF ILLUSTRATIVE EMBODIMENTS

It should be understood at the outset that although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

WLAN networks based on IEEE 802.11 may serve sensors as well as offloading devices. Sensor information, such as smart meter information, may be used to control centers in smart-grid applications. Sensors may be powered by batteries and deployed at remote locations. Therefore, the sensor batteries may decay over time. When sensor batteries decay the transmissions from the sensor may become weak. Offloading devices may also be powered by batteries. However, because offloading devices generally are not remotely deployed, their batteries are easily charged or replaced. A repeater or forwarder may be used to further transmit a frame from a power constrained device, such as a low power sensor, to its destination. The use of a repeater for relaying may increase the reach of power constrained devices.

Figure 1:
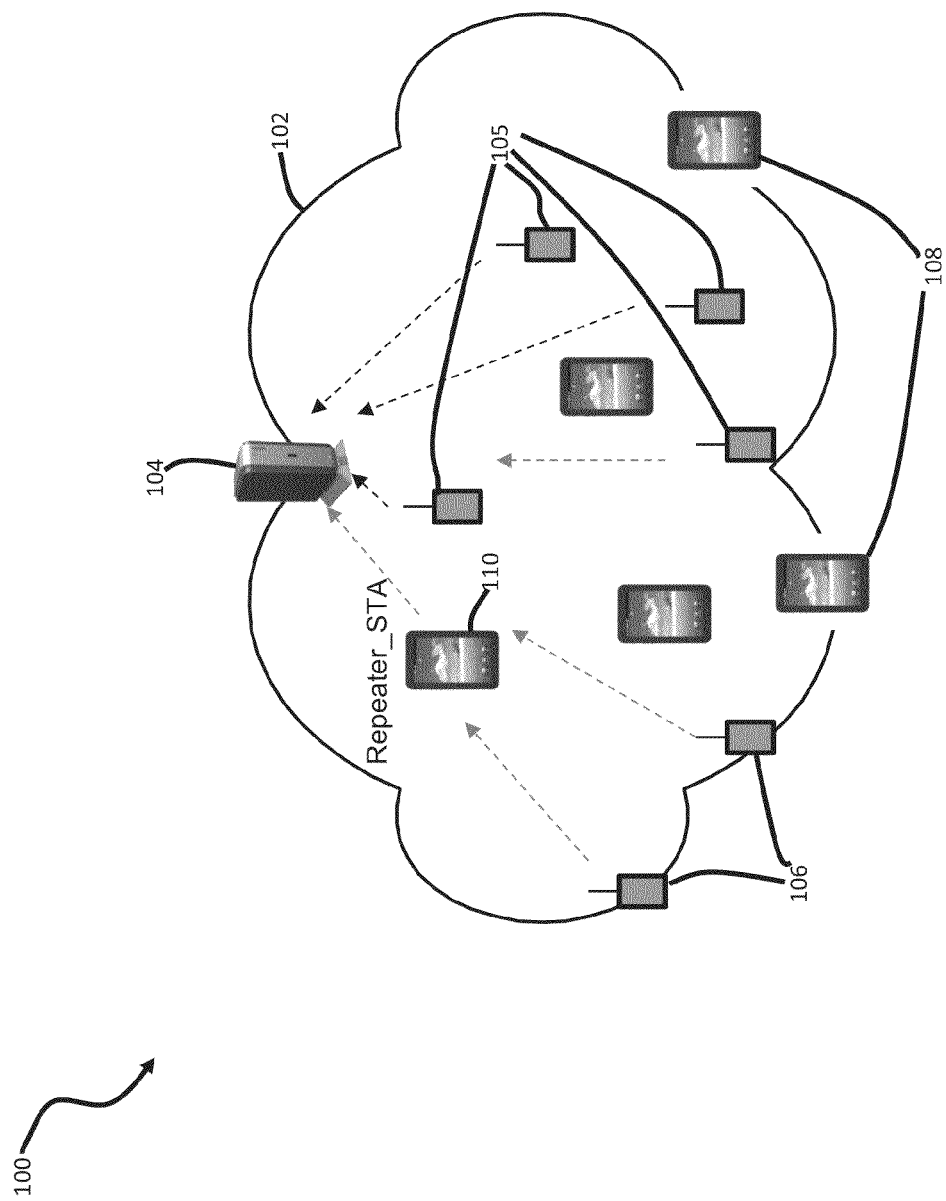
FIG. 1 illustrates an embodiment system for radio frequency (RF) repeating.

FIG. 1 illustrates system 100 for using a radio-frequency (RF) repeater to relay frames from power constrained devices. System 100 includes basic service set (BSS) 102. BSS 102 contains access point 104, which is coupled to stations. The stations include sensors 105, sensors 106 and offloading devices 108. Sensors 106 and sensors 105 may be smart meters, temperature sensors, and pressure sensors, while offloading devices 108 may be smart phones, tablets, laptops, or other devices. Sensors may be small and remotely deployed. Also, sensors may measure and upload data, while offloading devices may receive streamed audio or video, e-mail, internet, transmit and receive voice, download or play games, use services, or download large amounts of data. More or fewer stations, sensors, and offloading devices may be used. Also, other types of stations may be present.

BSS 102 also includes repeater 110 which is an RF repeater. In one example, repeater 110 is a station, such as an offloading device. In another example, repeater 110 is a dedicated device. In an example, repeater 110 is an offloading device. One repeater is pictured, but more repeaters may be present. Repeater 110 is coupled to access point 104 and some of sensors 106, which may be power constrained devices. Additionally, repeater 110 has sufficient power to transmit frames to access point 104. In an example, the repeater functionality is deployed separately. In another example, the repeater functionality is included as a functional block inside a station. Repeater 110 boosts the power of the signals from sensors 106 to enable the signals to reach access point 104. Sensors 105 and offloading devices 108 have sufficient power to transmit signals to access point 104. Repeater 110 distinguishes between power constrained devices and devices that are not power constrained. Then, repeater 110 relays frames from the power constrained devices, but not from the devices that are not power constrained. Sensors may be power constrained. Because sensors may be small and remotely deployed, the battery decays over time, and might not be charged or replaced. As the sensor battery decays, the sensor transmissions may not have sufficient power to reach access point 104.

Repeater 110 distinguishes frames from power constrained devices to be relayed. In one example, distinguishing between power constrained devices and devices that are not power constrained is performed in the physical layer (PHY) using the PHY header of the frame. Using the PHY layer simplifies the repeater design and avoids the implementation of a complex relay function.

Figure 2:
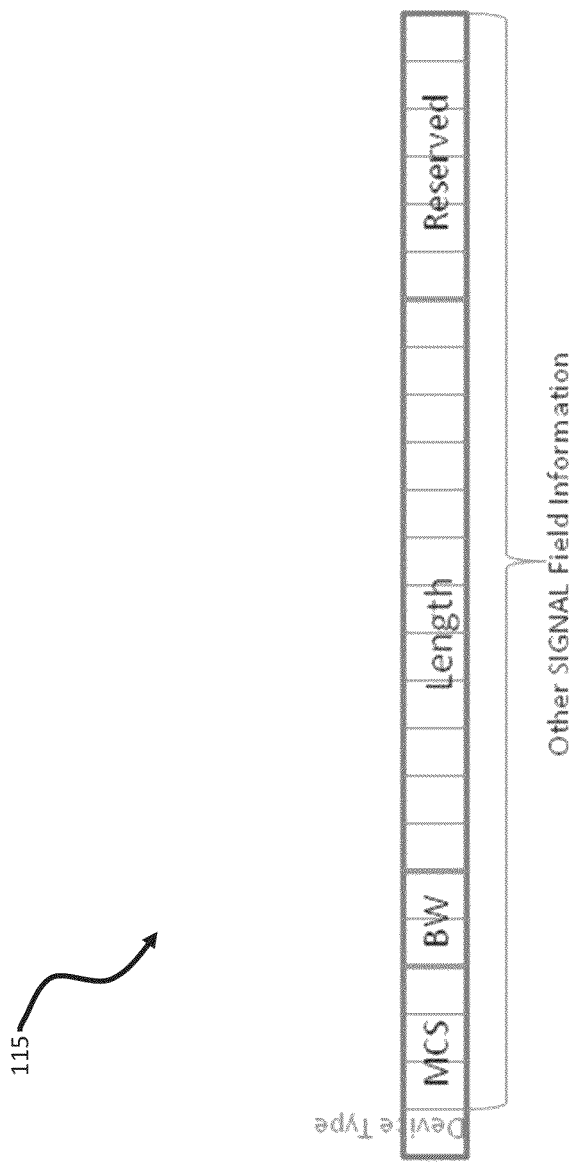
FIG. 2 illustrates a signaling field with a device type indicator.

In WLAN, the PHY data unit (PDU) includes a SIGNAL (SIG) field in the PHY preamble. FIG. 2 illustrates SIGNAL field 115, which indicates control characteristics relevant to the current transmission. SIGNAL field 115 includes a device type bit, bits for the modulation and coding scheme (MCS), bits for bandwidth (BW), bits for transmission length, and reserved bits. In one embodiment, a single bit in SIGNAL field 115, labeled device type, indicates whether a device is power constrained. In another example, the single bit is labeled forward_ind or a traffic type bit, or another name indicating whether the frame is from a power constrained device and requires further transmission. In one example, a "1" for the device type bit indicates that the frame is from a power constrained device and needs to be relayed, and a "0" for the device type bit indicates that the frame is from a device that is not power constrained and no further transmission is needed. In another example, a "0" for the device type bit indicates that the frame is from a power constrained device and needs to be relayed, and a "1" for the device type bit indicates that the frame is from a device that is not power constrained. The device type bit may indicate traffic or transmissions that originated from a sensor node or from an offloading device, where sensors are power constrained devices and offloading devices are not power constrained devices. Alternatively, the device type bit may indicate whether the frame is from a station that is low on power or from a station with adequate power. The device type bit indicates whether the frame needs to be forwarded by the repeater or the frame does not require further forwarding, and terminates at the receiving node. In an additional embodiment, more than one bit is used to indicate whether the device type or whether the station is a power constrained device. For example, multiple bits may be used to distinguish between more than two device types.

Figure 3:
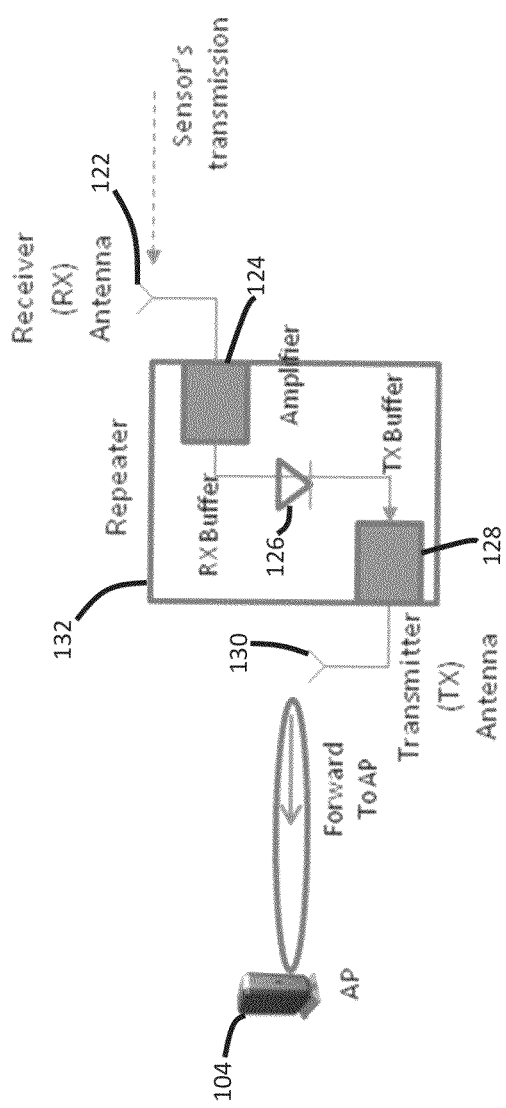
FIG. 3 illustrates an embodiment physical layer (PHY) layer based RF repeater.

In one example, the power constrained device indicator signal is detected entirely by the PHY layer. Only using the PHY layer is fast and convenient. FIG. 3 illustrates repeater 132 coupled to access point 104. Repeater 132 is used for a PHY layer only solution that does not utilize higher layers, such as the MAC layer. Repeater 132 contains two antennas, receive (RX) antenna 122, which receives a signal form a station, and transmit (TX) antenna 130, which relays the signal to access point 104. Because self-interference may be an issue, transmit antenna 130 may be a directional antenna that points towards access point 104 and away from receive antenna 122. Bits received by receive antenna 122 are placed in receive buffer 124. As bits are read out of receive buffer 124, they are amplified by amplifier 126, then placed in transmit buffer 128. Finally, the bits from transmit buffer 128 are relayed to access point 104 by transmit antenna 130.

Figure 4:
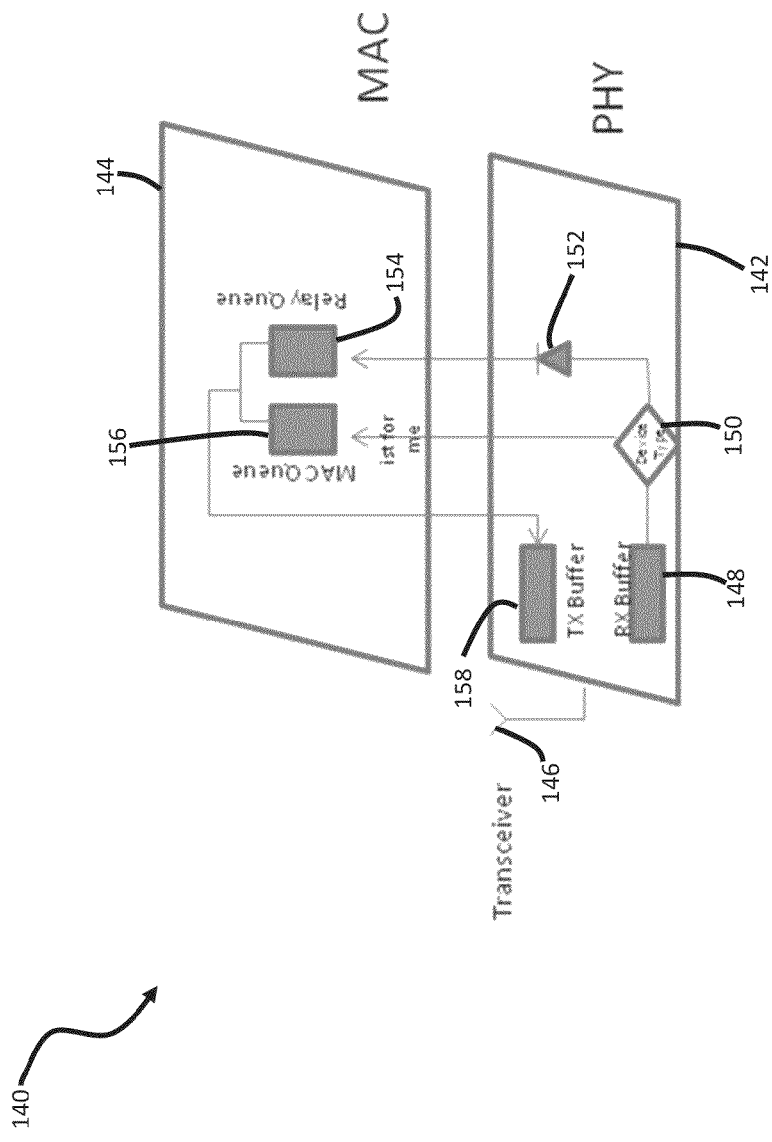
FIG. 4 illustrates an embodiment PHY and media access control (MAC) layer based RF repeater.

In another example, both PHY and MAC layer functionality are used for a repeater. Using both the PHY layer and the MAC layer may cause delays, but facilitate the use of a single antenna for receiving and transmitting. The PHY layer is predominantly used, while the MAC layer is minimally used. FIG. 4 illustrates repeater 140 with functionality in the PHY layer and the MAC layer. Repeater 140 includes only one antenna, transceiver 146, which performs both receiving and transmitting functions. Initially, a frame or transmission is received by transceiver 146, and placed in receive buffer 148. In addition to traditional WLAN PHY functionality, the received PDU is examined in PHY layer 142 by device type module 150. When the device type bit indicates that the frame is from a power constrained device, the bits are amplified by amplifier 152, the MAC Data Unit (MDU) is constructed by stripping the PHY header, and the bits are deposited in relay queue 154 in MAC layer 144. Generally, no further processing is needed. The bits in relay queue 154 are then placed in transmission buffer 158 in PHY layer 142. The bits in transmission buffer 158 are relayed to access point 104 by transceiver 146. When the device type bit indicates that the frame is from a station that is not power constrained, the MAC address of the received frame is checked. If the MAC address matches the address of repeater 140, the MDU is constructed from the received PDU, and the bits are placed in MAC queue 156 in MAC layer 144 for additional processing. When the MAC address does not match the address of repeater 140, the PDU is discarded. In one example, relay queue 154 and MAC queue 156 are separate logical queues that are implemented in the same physical buffer space. In another example, relay queue 154 and MAC queue 156 are implemented in separate physical buffer spaces.

Figure 5:
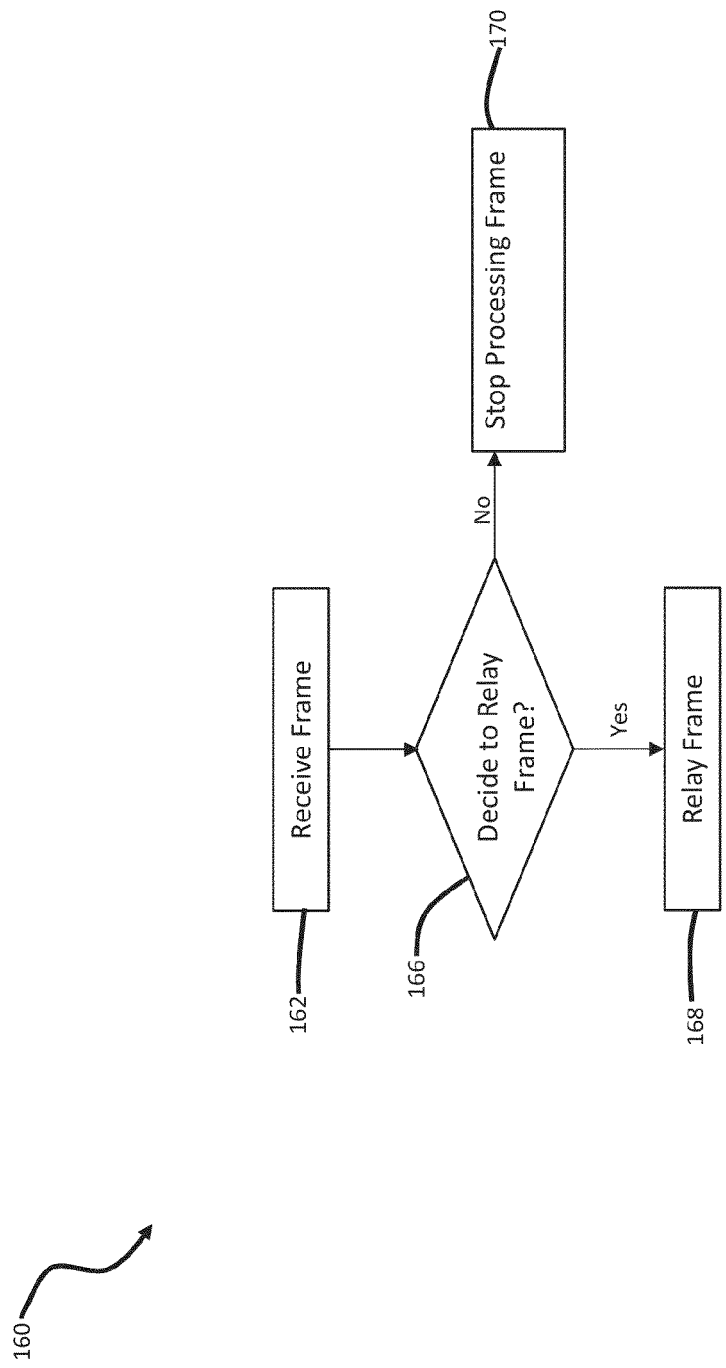
FIG. 5 illustrates an embodiment method of relaying a frame.

FIG. 5 illustrates flowchart 160 for a method of relaying a frame by repeater 110. Initially, in step 162, a frame is received from a station.

Then, in step 166, repeater 110 decides whether to relay the frame. Repeater 110 may decide whether to relay the frame. Repeater 110 may decide to relay the frame in step 168 when the frame is from a power constrained device, and to not to process the frame in step 170 when it is from a non-power constrained device. In one example, the frame is from a power constrained device when the frame is from a sensor, and the frame is not from a power constrained device when the frame is an offloading device. In another example, the frame is from a power constrained device when the frame is from a sensor that is low on power, and the frame is not from a power constrained device when it comes from a station that is not low on power or an offloading device. In an additional example, the decision to relay a frame is based on the power of the frame. Repeater 110 detects the power of the received frame. When the power of the received frame is below a threshold, receiver 110 decides to relay the frame in step 168. On the other hand, when power of the received frame is greater than or equal to the threshold, repeater 110 decides to discard the frame in step 170.

When repeater 110 decides to relay the frame, the frame is relayed to access point 104 in step 168. Repeater 110 determines the mechanism by which to relay the frame. Repeater 110 stores the frame to be relayed in its transmit buffer. Then, repeater 110 transmits the stored frame to the access point 104 when the frame reaches the head of the queue. When repeater 110 decides not to relay the frame, the frame is not processed any further in step 170.

Figure 6:
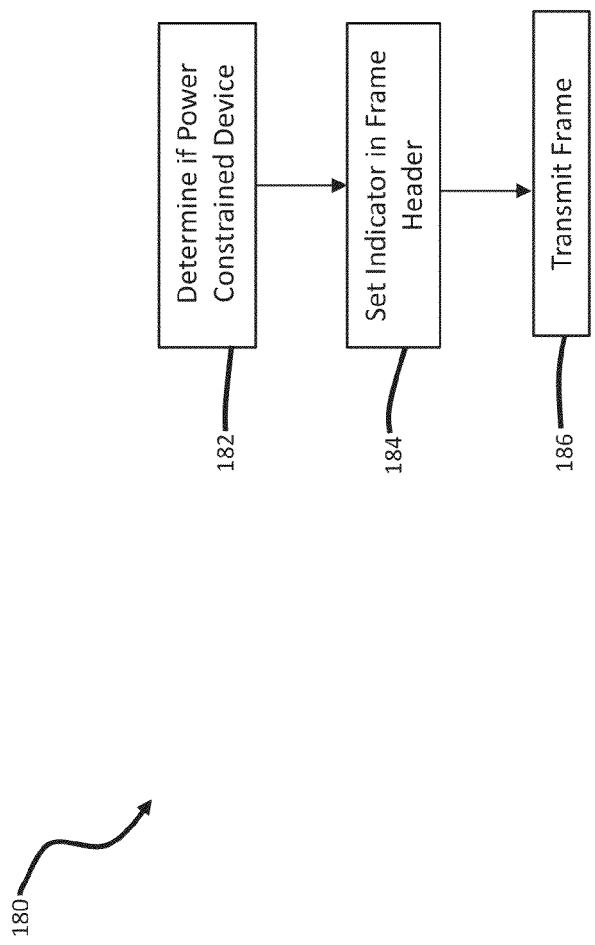
FIG. 6 illustrates an embodiment method of communicating a frame.

FIG. 6 illustrates flowchart 180 for a method of transmitting frames by a station. Initially, in step 182, the station determines if it is a power constrained device. For example, the station is a power constrained device when it is a sensor, and is not a power constrained device when it is an offloading device. In another example, the station is a power constrained device when its battery power is below a power threshold, or the power of a transmitted signal is below a signal threshold. The station is not a power constrained device when its battery power is at or above the power threshold, or if the power of a transmitted signal is at or above the signal threshold.

Then, in step 184, the station sets an indicator in a header of a frame based on whether the station is a power constrained device. The header may be a PHY layer header or a MAC layer header. In an example, the indicator is a device type bit, a single bit. In one example, the device type bit is set to a "1" when the station is a power constrained device, and is set to a "0" when the station is not a power constrained device. In another example, the device type bit is set to a "0" when the station is a power constrained device and to a "1" when the station is not a power constrained device. Alternatively, more than one bit may be used to indicate whether the station is a power constrained device.

Finally, in step 186, the frame is transmitted. The frame may be transmitted to access point 104 directly. Alternatively, the frame may be relayed by repeater 110 to access point 104.

Figure 7:
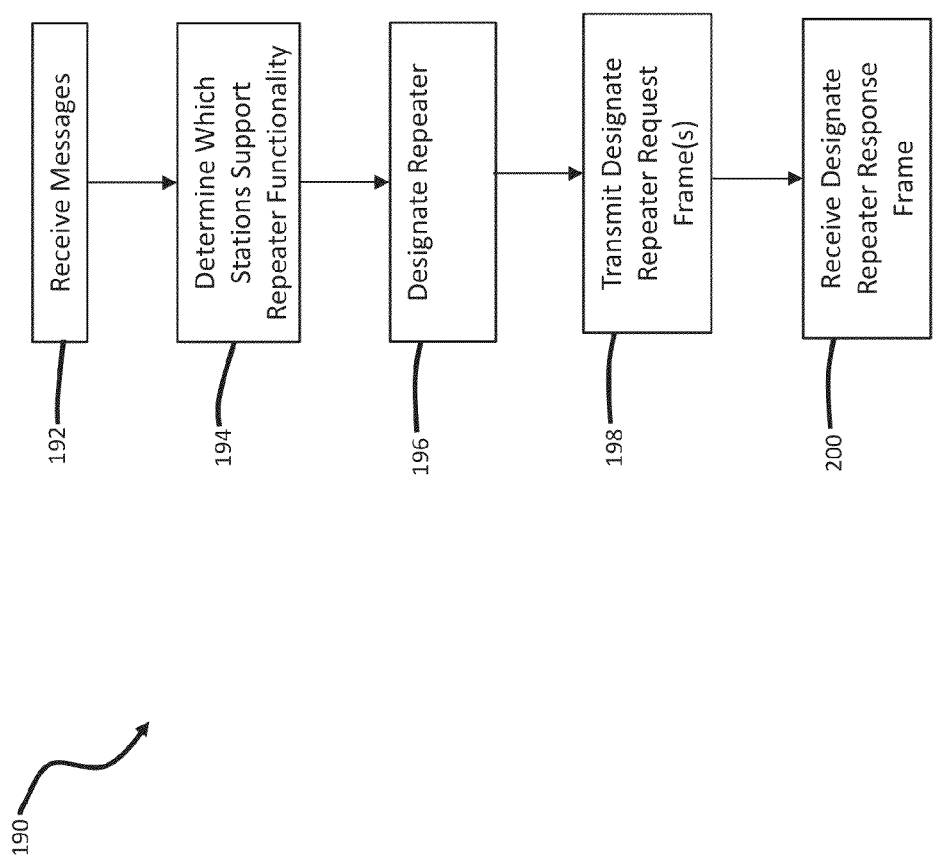
FIG. 7 illustrates an embodiment method of designating an RF repeater.

FIG. 7 illustrates flowchart 190 for a method of designating a repeater by access point 104. Initially, in step 192, access point 104 receives messages from stations. The messages may indicate whether the stations have the capability to support repeater functionality. The messages may also include additional information that access point 104 will use to designate one or more stations to be a repeater. Step 192 may be performed during association or re-association of the stations. The indication of capability to serve as a repeater may be achieved by adding a capability bit to an information element or information field, such as a capability field.

Then, in step 194, access point 104 determines which of the stations support repeater functionality. For example, this may be done based on an indicator of the station's capability to support repeater functionality.

Next, in step 196, access point 104 designates one or more station as a repeater. In one example, only one station is selected. In another example, multiple stations are selected. The device with repeater capability that has the highest power may be selected. Alternatively, a device is selected because it is located near sensors that need a relay.

In step 198, access point 104 transmits a designate repeater request frame or frames to the station or stations designated as a repeater. This frame may also be referred to as a repeater_announcement frame. Table 1, pictured below, illustrates an example of a format of a repeater designate request frame in an action management frame. Order 1 contains a category, and order 2 includes an action, such as a repeater designate request field. The repeater designate request field indicates whether the station is designated as a repeater. Additionally, order 3 has a designate repeater identification (ID) field, while order 4 contains other fields. Examples of a designate repeater ID field include the MAC address or the association identifier (AID).

TABLE 1

| Order | Info |
|---|---|
| 1 | Category |
| 2 | Action (Repeater Designate Request) |
| 3 | Designate Repeater ID |
| 4 | Other Fields |

In step 200, access point 104 receives a designate repeater response frame from the station or stations that access point 104 transmitted the designate repeater request frame to in step 198. Table 2 illustrates an example of a designate repeater response frame. The category is order 1, and an action, such as the repeater designate response, is order 2. The repeater designate response frame indicates that the station acknowledges its status as a designated repeater. Also, order 3 is the designate repeater ID. The order 4 is the status. In an example, the status is a single bit. In one example, the status field is set to a "1" when the station is designated as a repeater, and is set to a "0" when the station is not designated as a repeater. In another example, the status field is set to a "0" when the station is designated as a repeater, and to a "1" when the station is not designated as a repeater. The order 5 is other fields.

TABLE 2

| Order | Info |
|---|---|
| 1 | Category |
| 2 | Action (Repeater Designate Response) |
| 3 | Designate Repeater ID |

TABLE 2-continued

| Order | Info |
|---|---|
| 4 | Status |
| 5 | Other Fields |

Figure 8:
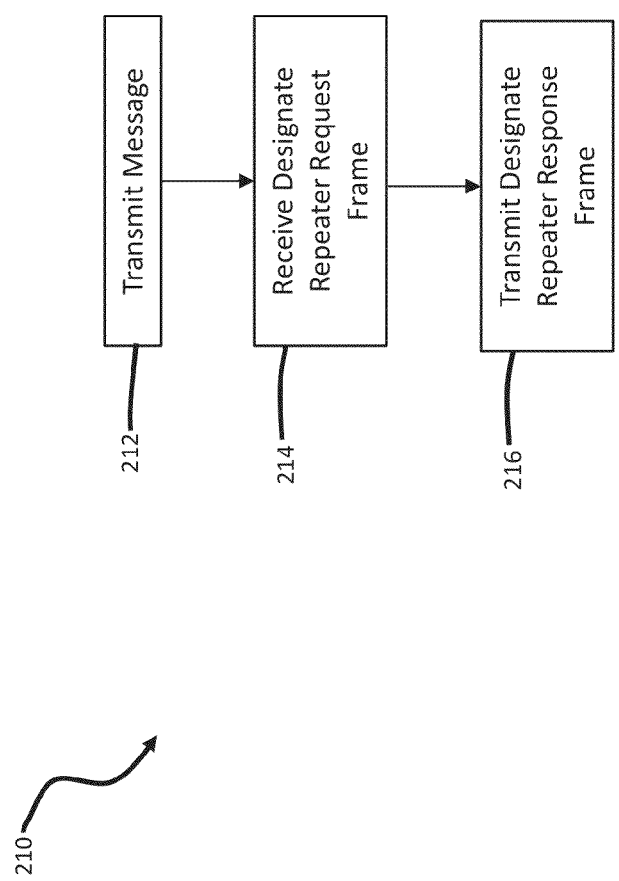
FIG. 8 illustrates another embodiment method of designating an RF repeater.

FIG. 8 illustrates flowchart 210 for a method of being designated as a repeater by a station. Initially, in step 212, the station transmits a message to access point 104. The message may be transmitted during association or re-association with access point 104. The message indicates whether the station supports repeater functionality. In an example, sensors do not support repeater functionality, while offloading devices do support repeater functionality. In another example, sensors and some offloading devices do not support repeater functionality, while other offloading devices do support repeater functionality. Relay functionality of a device may be available in an offloading device. The relay functionality may be turned on and off according to network planning capability. The indication of repeater capability may be achieved by adding a capability bit to an information element or information field, such as a capability field.

Then, in step 214, the station receives a designate repeater request frame from access point 104. The designate repeater request frame indicates whether the station is designated as a repeater. Table 1 above illustrates an example of a designate repeater request frame. The designate repeater request frame includes a category, a designate repeater request frame, a designate repeater ID filed, and other fields.

Finally, in step 216, the station transmits a designate repeater response frame indicating its acknowledgment of its status as a designated repeater. An example of a designate repeater response frame is indicated in Table 2, above. The designate repeater response frame includes a category, a repeater designate response field, a designate repeater ID, a status, and other fields.

Figure 9:
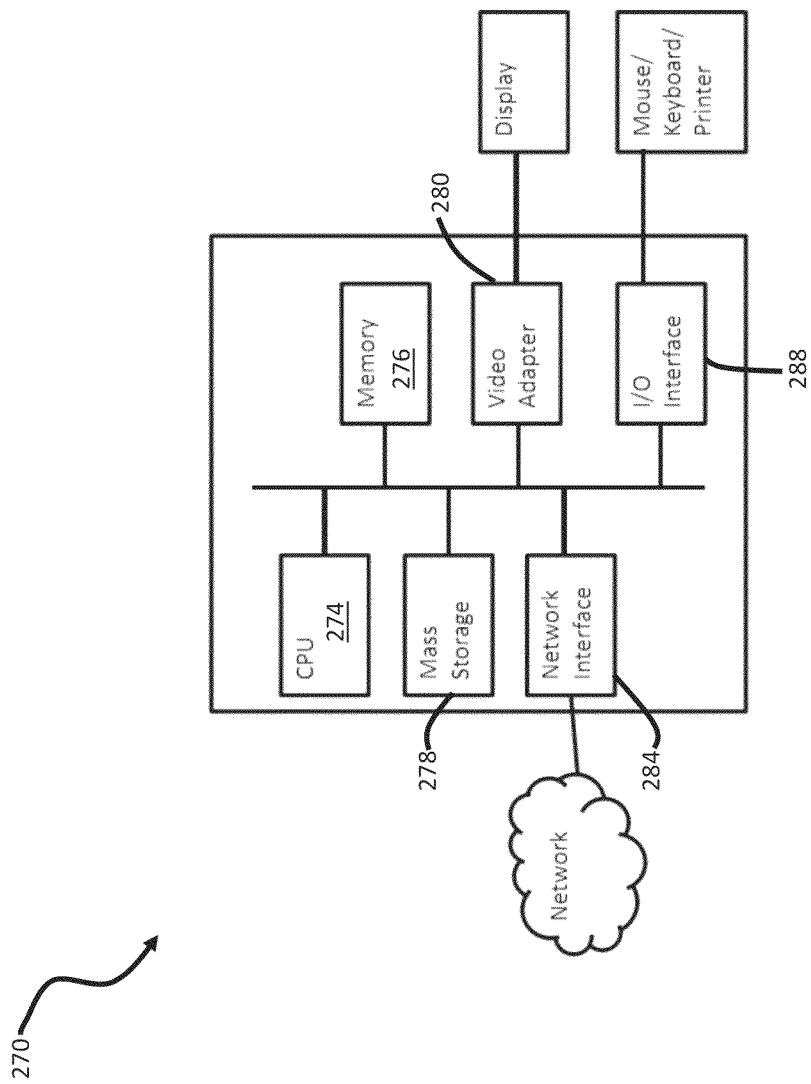
FIG. 9 illustrates a block diagram of an embodiment of a general-purpose computer system.

FIG. 9 illustrates a block diagram of processing system 270 that may be used for implementing the devices and methods disclosed herein. Specific devices may utilize all of the components shown, or only a subset of the components, and levels of integration may vary from device to device. Furthermore, a device may contain multiple instances of a component, such as multiple processing units, processors, memories, transmitters, receivers, etc. The processing system may comprise a processing unit equipped with one or more input devices, such as a microphone, mouse, touchscreen, keypad, keyboard, and the like. Also, processing system 270 may be equipped with one or more output devices, such as a speaker, a printer, a display, and the like. The processing unit may include central processing unit (CPU) 274, memory 276, mass storage device 278, video adapter 280, and I/O interface 288 connected to a bus.

The bus may be one or more of any type of several bus architectures including a memory bus or memory controller, a peripheral bus, video bus, or the like. CPU 274 may comprise any type of electronic data processor. Memory 276 may comprise any type of system memory such as static random access memory (SRAM), dynamic random access memory (DRAM), synchronous DRAM (SDRAM), read-only memory (ROM), a combination thereof, or the like. In an embodiment, the memory may include ROM for use at boot-up, and DRAM for program and data storage for use while executing programs.

Mass storage device 278 may comprise any type of storage device configured to store data, programs, and other information and to make the data, programs, and other information accessible via the bus. Mass storage device 278 may comprise, for example, one or more of a solid state drive, hard disk drive, a magnetic disk drive, an optical disk drive, or the like.

Video adaptor 280 and I/O interface 288 provide interfaces to couple external input and output devices to the processing unit. As illustrated, examples of input and output devices include the display coupled to the video adapter and the mouse/keyboard/printer coupled to the I/O interface. Other devices may be coupled to the processing unit, and additional or fewer interface cards may be utilized. For example, a serial interface card (not pictured) may be used to provide a serial interface for a printer.

The processing unit also includes one or more network interface 284, which may comprise wired links, such as an Ethernet cable or the like, and/or wireless links to access nodes or different networks. Network interface 284 allows the processing unit to communicate with remote units via the networks. For example, the network interface may provide wireless communication via one or more transmitters/transmit antennas and one or more receivers/receive antennas. In an embodiment, the processing unit is coupled to a local-area network or a wide-area network for data processing and communications with remote devices, such as other processing units, the Internet, remote storage facilities, or the like.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

What is claimed is:

1. A method for relaying frames, the method comprising:
    receiving, by a repeater from a first station, a first frame, wherein the first frame has a first header having a first forward indicator bit;
    determining whether the first frame will be relayed in accordance with the first forward indicator bit, comprising
        determining that the first frame will be relayed when the first forward indicator bit is equal to 1, and
        determining that the first frame will not be relayed when the first forward indicator bit is equal to 0; and
    transmitting, by the repeater to an access point, the first frame when the first frame is determined to be relayed.

2. The method of claim 1, wherein the header is a physical layer (PHY) header.

3. The method of claim 2, wherein receiving the first frame is performed by a first antenna of the repeater, and wherein transmitting the first frame is performed by a second antenna of the repeater.

4. The method of claim 1, wherein the header is a media access control (MAC) header.

5. The method of claim 4, wherein receiving the first frame is performed by an antenna of the repeater, and wherein transmitting the first frame is performed by the antenna of the repeater.

6. The method of claim 1, wherein receiving the first frame comprising receiving the first frame by a transceiver, and wherein transmitting the first frame comprises transmitting the first frame by the transceiver.

7. The method of claim 1, wherein receiving the first frame comprising receiving the first frame by a receive antenna, and wherein transmitting the first frame comprises transmitting the first frame by a transmit antenna.

8. The method of claim 1, wherein determining whether the first frame will be transmitted comprises estimating a signal strength of the first frame.

9. The method of claim 1, further comprising:
receiving, by the repeater from a second station, a second frame, wherein the second frame has a second header having a second forward indicator bit;
determining whether the second frame will be relayed in accordance with the second forward indicator bit; and
transmitting, by the repeater to the access point, the second frame when the second frame is determined to be relayed.

10. The method of claim 1, further comprising detecting a power of the first frame, wherein determining whether the first frame will be relayed further comprises determining whether the first frame will be relayed in accordance with the power of the first frame.

11. The method of claim 1, further comprising storing the first frame in a queue, wherein transmitting the first frame comprises transmitting the first frame when the first frame is at a head of the queue.

12. The method of claim 1, wherein determining whether the first frame will be relayed comprises determining whether the first station is a sensor.

13. The method of claim 1, wherein determining whether the first frame will be relayed comprises determining whether the first station is a power constrained device.

14. A repeater comprising:
a processor; and
a computer readable storage medium storing programming for execution by the processor, the programming including instructions to
receive, from a first station, a first frame, wherein the first frame has a header having a first forward indicator bit,
determine whether the first frame will be relayed in accordance with the first forward indicator bit comprising instructions to
determine that the first frame will be relayed when the first forward indicator bit is equal to 1, and
determine that the first frame will not be relayed when the first forward indicator bit is equal to 0, and
transmit, to an access point, the first frame when the first frame is determined to be relayed.

15. The repeater of claim 14, wherein the header is a physical layer (PHY) header.

16. The repeater of claim 15, wherein the instructions to receive the first frame comprises instructions to receive the first frame by a first antenna of the repeater, and wherein the instructions to transmit the first frame comprises instructions to transmit the first frame by a second antenna of the repeater.

17. The repeater of claim 14, wherein the header is a media access control (MAC) header.

18. The repeater of claim 17, wherein the instructions to receive the first frame comprises instructions to receive the first frame by an antenna of the repeater, and wherein the instructions to transmit the first frame comprises instructions to transmit the first frame by the antenna of the repeater.

19. The repeater of claim 14, wherein the instructions to determine whether the first frame will be transmitted comprises instructions to estimate a signal strength of the first frame.

20. The repeater of claim 14, wherein the programming further includes instructions to:
receive, from a second station, a second frame, wherein the second frame has a second header having a second forward indicator bit;
determine whether the second frame will be relayed in accordance with the second forward indicator bit; and
transmit, to the access point, the second frame when the second frame is determined to be relayed.

21. The repeater of claim 14, wherein the instructions to determine whether the first frame will be relayed comprises instructions to determine whether the first station is a power constrained device.

* * * * *